Sept. 14, 1948. G. B. WILLIAMS 2,449,265
ADJUSTABLE CONDUIT FOR RADIATOR
AND ENGINE CONNECTION
Filed Nov. 8, 1947 2 Sheets-Sheet 1
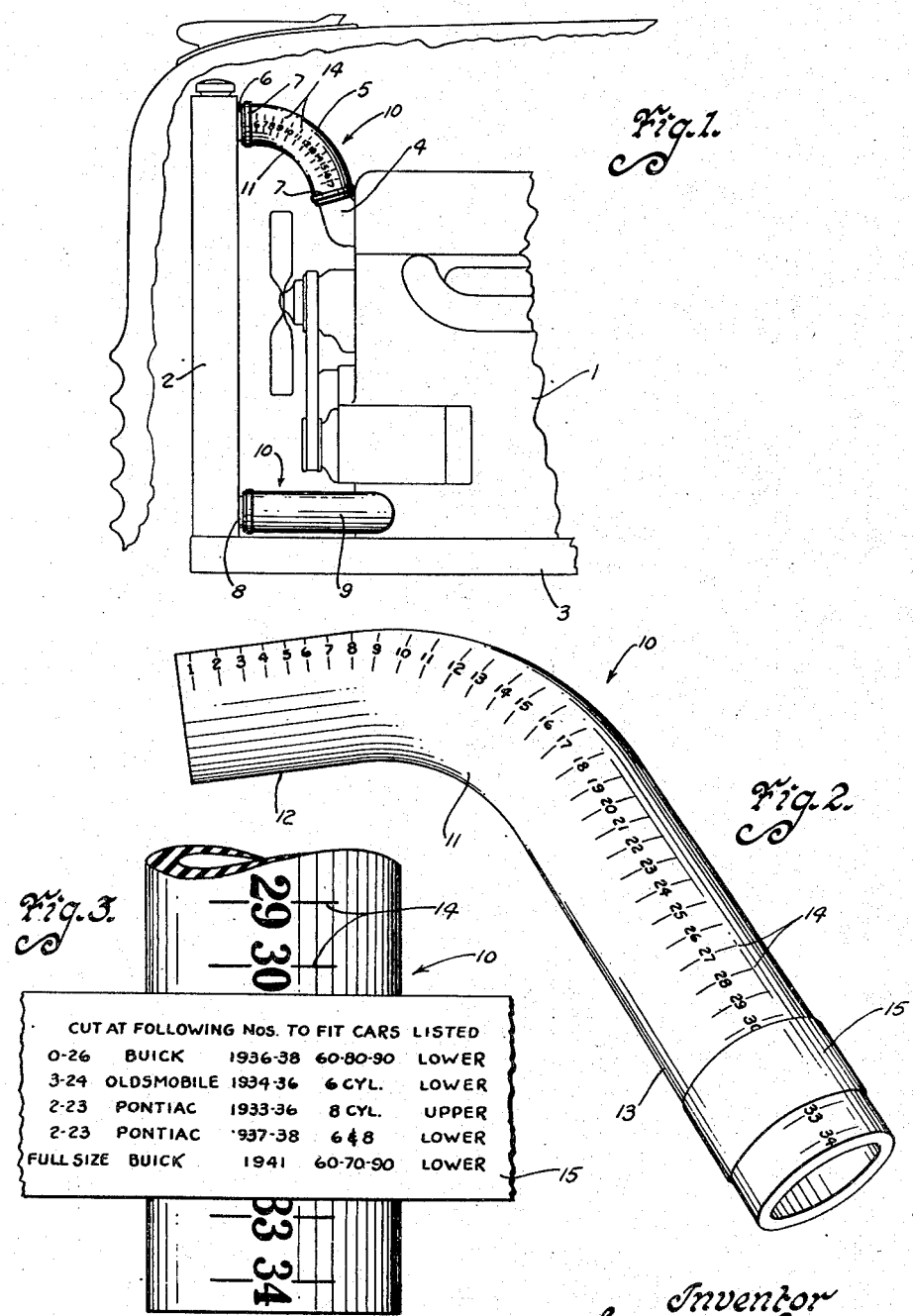

Sept. 14, 1948.  G. B. WILLIAMS  2,449,265
ADJUSTABLE CONDUIT FOR RADIATOR
AND ENGINE CONNECTION
Filed Nov. 8, 1947  2 Sheets-Sheet 2
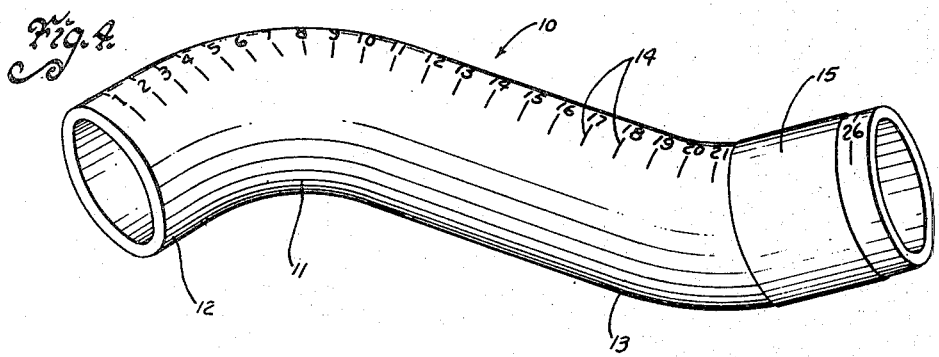
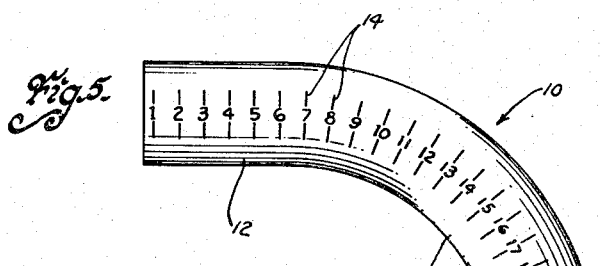
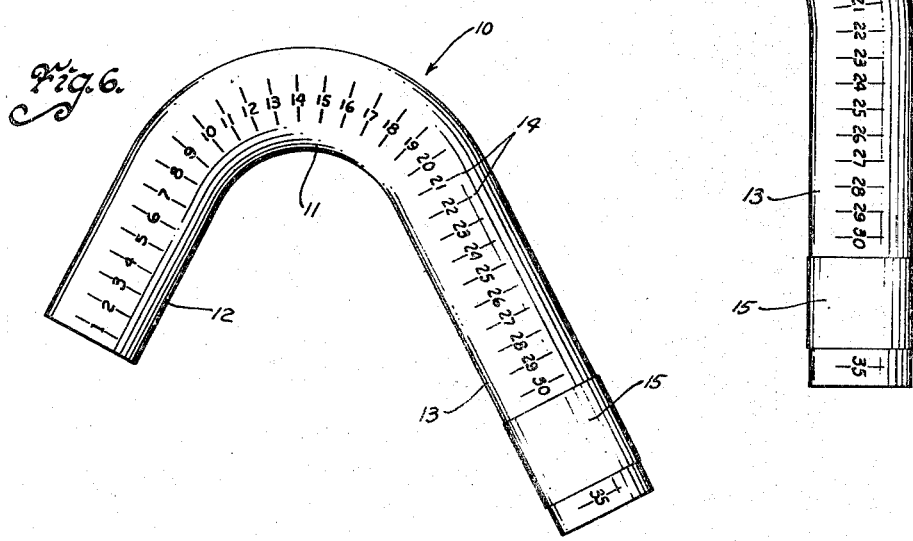
Inventor
Glenn B. Williams
by Harry L. Yunger
Attorney
Witness
Edward P. Seeley Patented Sept. 14, 1948

2,449,265

UNITED STATES PATENT OFFICE 2,449,265

ADJUSTABLE CONDUIT FOR RADIATOR AND ENGINE CONNECTION

Glenn B. Williams, Ralston, Nebr.

Application November 8, 1947, Serial No. 784,914

1 Claim. (Cl. 138—49)

This invention relates to a conduit for use between an automobile engine cooling system and a radiator and more particularly to a conduit made of a standard length and shape that may be cut to be fitted to a number of different automobiles according to a chart associated with the conduit.

Every internal combustion engine in an automobile must have a cooling system with a cooling medium flowing therethrough. The cooling medium gains heat from the internal combustion engine and it is necessary to direct the cooling medium to a radiator to be cooled so that the same cooling medium may be used continuously. The radiator must thus have an inlet for the cooling medium of the engine and an outlet from the radiator after the cooling medium has passed therethrough. The internal combustion engine has an outlet for the cooling medium at the top thereof and an inlet for the cooling medium to the internal combustion engine at the bottom of the engine. It is necessary to connect the outlet of the engine with the inlet to the radiator to establish flow of the cooling medium from the engine to the radiator and the outlet of the radiator must be connected with the inlet to the engine for the cooling medium. It is with the problem of providing conduits for these connections that the present invention is involved.

It is an object of the invention among others to provide several conduits to extend between an automobile engine and radiator wherein the several conduits are adjustable to fit a variety of automobiles.

It is another object of the invention to provide several conduits to extend between an automobile engine and radiator wherein the garage man for the small investment involved in stocking the several conduits that are adjustable, can care for a large number and varieties of automobiles without the investment of stocking a specific conduit for each make and variety of automobile.

It is still a further object of the invention to provide several conduits to extend between an automobile engine and radiator wherein the garage man need not possess any particular skill to select the proper conduit for any make or variety of automobile and to provide the adjustment necessary to fit the chosen conduit between the engine and radiator.

With the foregoing and other objects in view, the invention will be more fully described herewith and will be particularly pointed out in the claim appended hereto.

In the drawings, wherein like symbols refer to like or corresponding parts throughout the several views:

Figure 1 is a side elevational view showing conduit members connected between the engine and radiator of an automobile.

Figure 2 is a close-up side elevational view of one of the conduit members.

Figure 3 is an enlarged elevational view of one end of a conduit showing a chart member before being wrapped around the conduit.

Figures 4, 5 and 6 show elevational views of other conduit members with each conduit varying as to the preformed curved section.

Automobile manufacturers in designing an automobile pay slight attention, in placing the engine and radiator on a chassis, to having the outlet from the engine cooling system come directly opposite the inlet to the radiator and having the outlet from the radiator come directly opposite the inlet to the engine cooling system. A flexible conduit of rubber hose has been employed to connect the outlet from the engine cooling system to the inlet to the radiator and likewise a flexible conduit of rubber has been employed to connect the outlet of the radiator to the inlet to the engine cooling system. Very seldom does it occur that a straight length of hose can be used since the respective outlets and inlets lie in different planes necessitating a curve in the connecting conduit. The conduit may either be formed with the correct curve and of the proper length or a straight length of hose may be employed and flexed to get the proper curve.

The conduits being of rubber for the needed flexibility wear out and need replacement constantly. The ordinary garageman and sevice station operator could not hope to carry conduits in stock to fit every model and make of automobile in operation today. First the investment would be prohibitive and secondly the space to store and mark the conduits would be all out of proportion to the profit return. Some garages and service stations carry a coil of hose in stock and attempt to make their own conduits by cutting to a proper length and then flexing the straight conduit to get the proper curve. This results in waste in that the hose can be cut too short as it is very hard to measure for the proper length and to bend the hose, puts the rubber under stress which causes the conduit to wear very fast.

In the present invention, Figure 1 shows diagrammatically an automobile engine 1 of the internal combustion type which has a cooling system therewith and a cooling medium circulating through the engine 1. A radiator 2 is shown through which the cooling medium passes to be reduced in temperature so the same cooling medium can be used continuously to make a closed system for the cooling medium.

As previously stated, the automobile designer has other considerations for locating the engine and radiator on the automobile chassis 3, other than making a straight connection between the engine and radiator. The engine 1 has an exit nipple 4 for the engine cooling system through which the cooling medium may flow. The nipple 4 is connected by a conduit 5 with an inlet nipple 6 extending from the top of the radiator 2. The conduit 5 is of rubber to be flexible, fits over the nipples 4 and 6 and the ends of the conduit 5 are clamped by ordinary clamps 7 to seal with the nipples 4 and 6. An outlet nipple 8 extends from the lower end of the radiator 2, connects with a second conduit 9 which in turn connects into the inlet (not shown) of the engine cooling system.

As will be noted, the inlet nipple 6 of the radiator 2 is in a different horizontal plane than the outlet nipple 4 from the engine 1, thus necessitating a curve in the nipple 5. Likewise, the exit nipple 8 at the bottom of the radiator 2 is in a different vertical plane than the inlet (not shown) to the engine cooling system thus necessitating a curve in the conduit 9. As can be very well visualized, for different makes and models of automobiles the distance between nipples can vary so as to require different length conduits and the distance between horizontal and vertical planes can vary so as to require different degrees of curvature in the conduits.

Figures 2, 4, 5 and 6 show a series of conduits 10 each having a preformed curved portion 11 and straight conduit portions 12 and 13 extending from each end of the curved portion 11. The curved portions 11 vary in order to fit inlets and outlets between the radiators and engines where the distances of horizontal and vertical planes vary. The conduit 10 of Figure 6 is curved to an angle 11 less than 90 degrees; the conduit 10 of Figure 5 is curved to an angle 11 of approximately 90 degrees; the conduit 10 of Figure 2 is curved to angle 11 between 90 degrees and 180 degrees; and the conduit 10 of Figure 4 is curved to an angle 11 that closely approaches 180 degrees. With this variety of angle curves 11, it is found that the majority of the makes and models of automobiles are covered.

The conduits 10 over their entire lengths are divided into unit lengths and are marked by numerals starting at zero at one end and proceeding to the other end of the conduit. The conduit 10 of Figure 2 runs to thirty-four; the conduit 10 of Figure 4 to twenty-six; and the conduits 10 of Figures 5 and 6 go to thirty-five. Each unit length is marked by lines, as an example the lines 14 of Figure 2, which lines 14 extend a substantial distance around the outer periphery of the conduits 10. The conduits 10 may be cut through on any line 14 to sever a portion of the straight conduits 12 or 13 on either side of the curved portion 11 to adjust the length of the conduit 10. It is noted that lines 14 are so placed on the peripheries of the conduits 10 that when cuts through the conduits 10 are made through the lines 14, the plane of the cuts through the conduits from end to end will always be perpendicular to a center line through the conduits 10 regardless of which line 14 is chosen to make the cut.

Upon the end of each conduit 10 is wrapped a chart 15, with Figure 3 showing an enlarged view of one of the charts before being wrapped. The chart 15 carries information for the garageman and service station operator as to just which make of automobiles, year and models the particular conduit 10 will fit and where the installator must cut to adopt the conduit 10 to the particular automobile in which it is to be installed.

If the conduit 10 of Figure 2, referring to chart 15 in Figure 3, were cut at twenty-six thus severing the straight portion 13 to the right of twenty-six. The conduit 10 as now cut, will fit a Buick automobile, made in years 1936-1938 and having model numbers 60—80—90. The conduit 10 thus cut will be for the lower conduit, such as shown at 9 in Figure 1 as can be seen from the first row of the chart 15.

In operation, the garage owner or service station owner stocks the conduits 10 as shown in Figures 2, 4, 5 and 6 instead of stocking separate conduits for each model, each year and make of automobile. When it is necessary to replace a conduit, the installator looks over the charts 15 to find the conduit 10 with the proper preformed curve 11. After the proper conduit with the preformed curve is located, the chart 15 is consulted to determine if the conduit 10 chosen is proper length. The chart 15, in the first column will show where the straight portions 12 and 13 are to be severed and the installator makes the cuts. After this the conduit 10 may be installed.

It can therefore be seen that several standard conduits can be carried which are adjustable to care for many different installations without the necessity of a large number of separate conduits.

It will be understood that the invention has been described for purposes of illustration and explanation and that changes and variations are possible without departing from the scope of the invention; all such modifications and changes are intended to be included in the appended claim.

I claim:

In conduits for use between an engine having a cooling system and a radiator to conduct a cooling medium from the engine cooling system to the radiator and from the radiator back to the engine cooling system wherein the exit from the engine cooling system is in a different plane from the entrance to the radiator and the exit from the radiator being in a different plane from the entrance to the engine cooling system necessitating a bend or curve in the conduits when the conduits are coupled between the entrance and exit of the radiator to the exit and entrance respectively of the engine cooling system, the improvement comprising a flexible conduit having a preformed curved portion, a straight portion of conduit extending from each end of the curved portion of the conduit, said straight ends adapted to be severed perpendicularly to the axis through the conduit at any selected point inwardly of the straight ends to provide a connection between an engine cooling system and a radiator independent of the location of each.

GLENN B. WILLIAMS.

REFERENCES CITED

The following references are of record in the file of this patent:

UNITED STATES PATENTS

| Number | Name | Date |
| --- | --- | --- |
| 639,605 | Nordlinger | Dec. 19, 1899 |
| 986,905 | Carlson | Mar. 14, 1911 |
| 1,942,468 | Andrews | Jan. 9, 1934 |

FOREIGN PATENTS

| Number | Country | Date |
| --- | --- | --- |
| 765,578 | France | June 12, 1934 |